(12) United States Patent
Yu

(10) Patent No.: US 11,324,575 B2
(45) Date of Patent: May 10, 2022

(54) PUMP BODY OF ORAL IRRIGATOR

(71) Applicant: Lei Yu, Guangdong (CN)

(72) Inventor: Lei Yu, Guangdong (CN)

(73) Assignee: Shenzhen Yuxinyuan Electric Technology Co., Ltd., Shenzhen (CN)

( * ) Notice: Subject to any disclaimer, the term of this patent is extended or adjusted under 35 U.S.C. 154(b) by 13 days.

(21) Appl. No.: 17/095,776

(22) Filed: Nov. 12, 2020

(65) Prior Publication Data

US 2021/0059800 A1 Mar. 4, 2021

(51) Int. Cl.
*A61C 17/02* (2006.01)

(52) U.S. Cl.
CPC .... *A61C 17/0202* (2013.01); *A61C 2204/002* (2013.01)

(58) Field of Classification Search
None
See application file for complete search history.

(56) References Cited

U.S. PATENT DOCUMENTS

| | | | | |
|---|---|---|---|---|
| 5,321,865 A * | 6/1994 | Kaeser | ............ | A61C 17/028 601/162 |
| 7,246,755 B2 * | 7/2007 | Hornsby | ............ | B05B 1/3436 222/153.13 |
| 7,621,687 B1 * | 11/2009 | Rehkemper | ............ | A61C 17/02 401/188 R |
| 2014/0154640 A1 * | 6/2014 | Mok | ............ | A61C 17/028 433/89 |
| 2014/0259474 A1 * | 9/2014 | Sokol | ............ | A61C 17/36 15/22.2 |
| 2016/0151133 A1 * | 6/2016 | Luettgen | ............ | A61C 17/0202 433/80 |
| 2017/0049530 A1 * | 2/2017 | Cacka | ............ | A61C 17/028 |
| 2019/0201175 A1 * | 7/2019 | Li | ............ | A61C 17/032 |
| 2020/0197143 A1 * | 6/2020 | Snyder | ............ | A61C 17/032 |

FOREIGN PATENT DOCUMENTS

| | | | | |
|---|---|---|---|---|
| EP | 0638294 A2 * | 2/1995 | ............ | A61C 17/02 |
| WO | WO-9214498 A1 * | 9/1992 | ............ | A61C 17/0202 |

* cited by examiner

*Primary Examiner* — Cris L. Rodriguez
*Assistant Examiner* — Courtney N Huynh

(57) ABSTRACT

A pump body of an oral irrigator includes a mount, a motor disposed at a rear end away from the mount, a pinion disposed on a shaft of the motor, an annular gear disposed on a shaft member to mesh with the pinion, a cam disposed in the annular gear and adjacent to one side, a linkage secured to the cam, front and rear plungers disposed on a front end of the linkage, and a cylindrical tube disposed on the plungers in the mount. The rotation of the cam only allows the linkage to repetitively move in a back-and-forth linear motion. Wear between the plungers and the cylindrical tube is decreased to a minimum and leakage is prevented.

8 Claims, 3 Drawing Sheets

PUMP BODY OF ORAL IRRIGATOR

BACKGROUND OF THE INVENTION

1. Field of the Invention

The invention relates to oral irrigators and more particularly to an improved pump body of an oral irrigator.

2. Description of Related Art

Conventionally, an oral irrigator (also known as water flosser) is an auxiliary tool for cleaning the teeth. It is a tool for flushing pressurized water on the teeth and through gaps between the teeth for cleaning purposes. Its main types are portable ones or ones mounted on sinks. The pressure of the water used by it is in the range between 0 psi and 90 psi. However, in use the head of the conventional oral irrigator has the following problems:

In the conventional art, the linkage of the head of the conventional oral irrigator is a metal shaft equipped with a plastic plunger. The linkage vibrates in the operation. Wear of the plunger is worsened. And in turn, it shortens the useful life of the plunger. Also, the sealing effect is poor.

As well known in the art, joining portions of the head of the conventional oral irrigator are liable to wear after a long time of use, thereby causing water to leak.

Thus, the need for improvement still exists.

SUMMARY OF THE INVENTION

The invention has been made in an effort to solve the problems of the conventional art including linkage vibration, worsened plunger wear, shortened useful life of the plunger, joining portions of parts being liable to wear, and leakage by providing a pump body of an oral irrigator having novel and nonobvious characteristics including greatly decreased plunger wear, significantly prolonged useful life of the parts, excellent sealing effect among the parts, and leakage prevention.

To achieve above objects including greatly decreased plunger wear, significantly prolonged useful life of the parts, excellent sealing effect among the parts, and leakage prevention, and other objects of the invention, the invention provides a pump body of an oral irrigator comprising a mount; a motor disposed at a rear end away from the mount; a pinion disposed on a shaft of the motor; a shaft member passing through the mount in front of the pinion; an annular gear disposed on the shaft member to mesh with the pinion; a cam disposed in the annular gear and adjacent to one side; a linkage secured to the cam; front and rear plungers disposed on a front end of the linkage; a cylindrical tube disposed on the plungers in the mount; a first silicone O-ring disposed on the linkage in a rear end of the cylindrical tube and having a front end adhered to the rear end of the cylindrical tube; a pump disposed at a front end of the cylindrical tube; a nozzle seat disposed at a front end of the pump; a first valve, a compression spring, and a second silicone O-ring disposed between the front end of the pump and the nozzle seat from rear to front sequentially; a nozzle extending from a front end of the nozzle seat; a lock plate for securing the nozzle to the nozzle seat; a third silicone O-ring and a fourth silicone O-ring disposed between the rear end of the nozzle seat and the lock plate from rear to front sequentially wherein the third silicone O-ring is fastened between the nozzle seat and the lock plate, the fourth silicone O-ring is secured onto the nozzle, and the fourth silicone O-ring is adhered to an inner surface of the lock plate; an inlet pipe disposed on a bottom of the pump; and a water outlet pipe disposed on a top of the pump.

Preferably, the mount includes a rear mounting member and a front mounting member threadedly secured together.

Preferably, the embodiment further comprises a plurality of limit plates disposed on the linkage relative to the first silicone O-ring for mounting the first silicone O-ring.

Preferably, the second silicone O-ring is disposed on the nozzle seat, and front and rear ends of the compression spring urge against the nozzle and the first valve respectively.

Preferably, the embodiment further comprises a fitting connected the inlet pipe to the pump, a second valve disposed on a top of the fitting, and a fifth silicone O-ring disposed below the second valve.

Preferably, the embodiment further comprises an inlet adapter disposed at an inlet of the inlet pipe, and a sixth silicone O-ring disposed on the water inlet adapter.

Preferably, the embodiment further comprises a water outlet adapter disposed on an outlet of the water outlet pipe, and a seventh silicone O-ring is disposed on the water outlet pipe.

Preferably, the embodiment further comprises a rechargeable battery in the rear of the mount and adjacent to one side of the mount for providing electricity to the motor.

The invention has the following advantageous effects in comparison with the prior art: the pump body of the oral irrigator has the following advantageous effects in comparison with the prior art: the rotation of the cam only allows the linkage to repetitively move in a back-and-forth linear motion. Thus, wear between the plungers and the cylindrical tube is decreased to a minimum. The plungers prevent leakage. The useful life of the parts is prolonged significantly. Sealing between any two joining parts is excellent due to the provision of the silicone O-rings. As a result, leakage is prevented.

The above and other objects, features and advantages of the invention will become apparent from the following detailed description taken with the accompanying drawings.

DETAILED DESCRIPTION OF THE INVENTION

Figure 1:
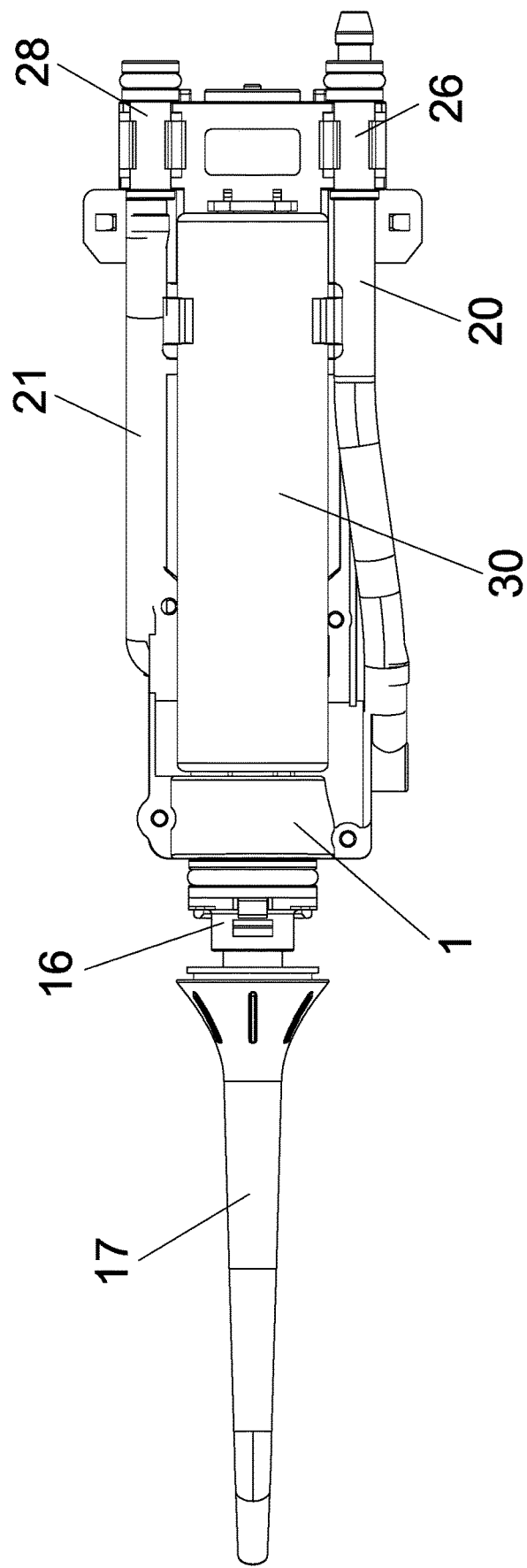
FIG. 1 is a structural schematic view of an oral irrigator according to the invention.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail.

Figure 2:
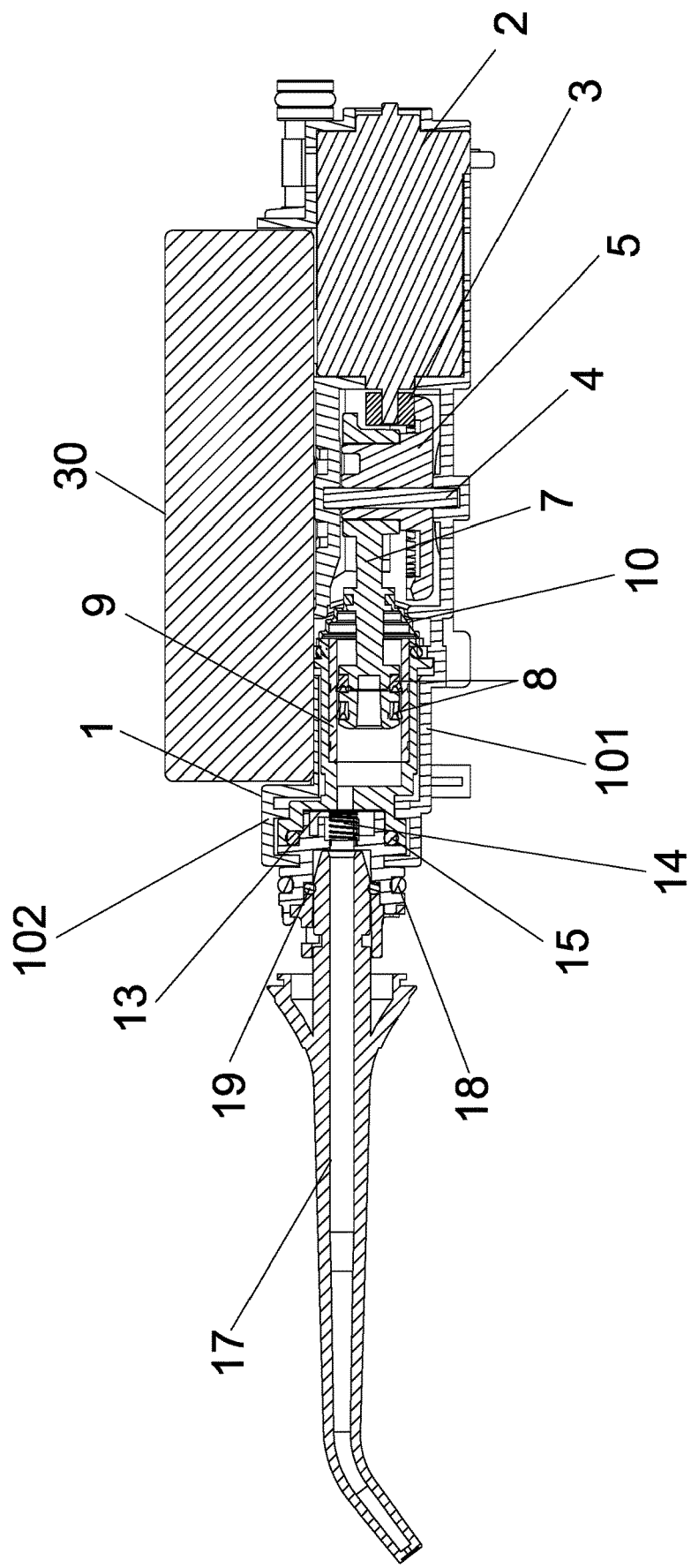
FIG. 2 is a bottom sectional view of the oral irrigator.
Figure 3:
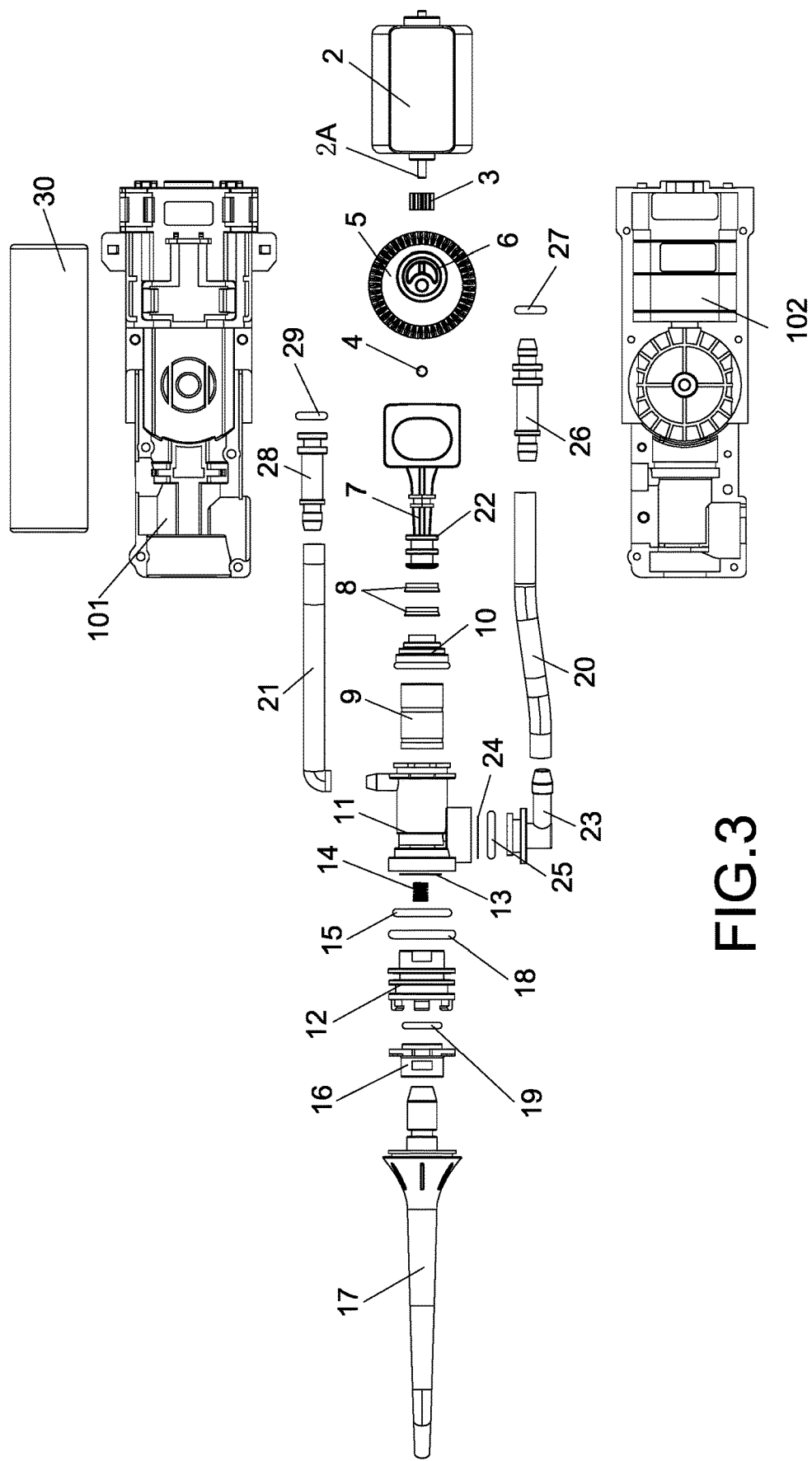
FIG. 3 is an exploded view of the oral irrigator.

Referring to FIGS. 1 to 3, a pump body of an oral irrigator in accordance with the invention comprises a mount 1; a motor 2 provided at the rear end away from the mount 1 and including a shaft 2A; a pinion 3 provided on the shaft 2A of the motor 2; a shaft member 4 passing through the mount 1 in front of the pinion 3; an annular gear 5 provided on the shaft member 4 to mesh with the pinion 3; a cam 6 provided in the annular gear 5 and adjacent to one side; a linkage 7 secured to the cam 6; front and rear plungers 8 provided on the front end of the linkage 7; a cylindrical tube 9 provided on the plungers 8 in the mount 1; a first silicone O-ring 10 provided on the linkage 7 in the rear end of the cylindrical tube 9 and having a front end adhered to the rear end of the cylindrical tube 9; a pump 11 provided at the front end of the cylindrical tube 9; a nozzle (also known as jet tip) seat 12 provided at the front end of the pump 11; a first valve 13, a compression spring 14, and a second silicone O-ring 15 provided between the front end of the pump 11 and the nozzle seat 12 from rear to front sequentially; a nozzle 17 extending from the front end of the nozzle seat 12; a lock plate 16 for securing the nozzle 17 to the nozzle seat 12; a third silicone O-ring 18 and a fourth silicone O-ring 19 provided between the rear end of the nozzle seat 12 and the lock plate 16 from rear to front sequentially in which the third silicone O-ring 18 is fastened between the nozzle seat 12 and the lock plate 16, the fourth silicone O-ring 19 is secured onto the nozzle 17, and the fourth silicone O-ring 19 is adhered to an inner surface of the lock plate 16; an inlet pipe 20 provided on a bottom of the pump 11; and a water outlet pipe 21 provided on a top of the pump 11.

Specifically, the mount 1 includes a rear mounting member 101 and a front mounting member 102 threadedly secured together.

In the embodiment, the mount 1 can be detached for repairing malfunctioned components because the rear mounting member 101 and the front mounting member 102 are threadedly secured together.

Specifically, a plurality of limit plates 22 are provided on the linkage 7 relative to the first silicone O-ring 10 for mounting the first silicone O-ring 10.

In the embodiment, the limit plates 22 are spaced apart for limiting the first silicone O-ring 10 so that the first silicone O-ring 10 can completely adhere to the cylindrical tube 9 to prevent leakage.

Specifically, the second silicone O-ring 15 is provided on the nozzle seat 12, and front and rear ends of the compression spring 14 urge against the nozzle 17 and the first valve 13 respectively.

In the embodiment, the second silicone O-ring 15 is used to prevent leakage between the nozzle seat 12 and the pump 11.

Specifically, a fitting 23 connects the inlet pipe 20 to the pump 11, a second valve 24 is provided on a top of the fitting 23, a fifth silicone O-ring 25 is provided below the second valve 24, an inlet adapter 26 is provided at an inlet of the inlet pipe 20, and a sixth silicone O-ring 27 is provided on the inlet adapter 26.

In the embodiment, the second valve 24 is a check valve to prevent water from entering the inlet pipe 20, the inlet pipe 20 is made of silicone, the fifth silicone O-ring 25 is used to seal a joining portion of the inlet pipe 20 and the pump 11, the inlet adapter 26 is connected to an external water pipe, and the sixth silicone O-ring 27 prevents leakage.

Specifically, a water outlet adapter 28 is provided on an outlet of the water outlet pipe 21, and a seventh silicone O-ring 29 is provided on the water outlet pipe 28.

In the embodiment, the water outlet adapter 28 is connected to an external drain pipe, and the seventh silicone O-ring 29 prevents leakage from a joining portion of the water outlet adapter 28.

Specifically, a rechargeable battery 30 is in the rear of the mount 1 and adjacent to one side of the mount 1 for providing electricity to the motor 2.

In the embodiment, the rechargeable battery 30 is used to provide electricity to the motor 2 and is portable.

Operating principle and use of the invention are detailed below. In use, the inlet pipe 20 is connected to an external water pipe using the inlet adapter 26, the water outlet pipe 21 is connected to the external drain pipe water using the water outlet adapter 28, the motor 2 is activated to rotate the pinion 3 and in turn the pinion 3 rotates the annular gear 5 on the shaft member 4, the annular gear 5 repetitively moves the linkage 7 in a back-and-forth linear motion using the cam 6, and in turn the linkage 7 repetitively moves the plungers 8 in a back-and-forth linear motion within the cylindrical tube 9. Wear between the plungers 8 and the cylindrical tube 9 is decreased to a minimum due to the stable back-and-forth linear motion of the linkage. The plungers 8 prevent leakage. The useful life of the oral irrigator is prolonged significantly. Water is pumped into the inlet pipe 20, flows to the nozzle seat 12 and finally leaves the nozzle 17 to clean the teeth of a user while the plungers 8 repetitively moves in a back-and-forth linear motion. The used water flows to the water outlet pipe 21 to flow away.

As discussed above, the pump body of the oral irrigator has the following advantageous effects in comparison with the prior art: the rotation of the cam 6 only allows the linkage 7 to repetitively moves in a back-and-forth linear motion. Thus, wear between the plungers 8 and the cylindrical tube 9 is decreased to a minimum. The plungers 8 prevent leakage. The useful life of the oral irrigator is prolonged significantly. Sealing between any two joining parts is excellent due to the provision of the silicon silicone O-rings. As a result, leakage is prevented.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

While the invention has been described in terms of preferred embodiments, those skilled in the art will recognize that the invention can be practiced with modifications within the spirit and scope of the appended claims.

What is claimed is:
1. A pump body of an oral irrigator comprising:
a mount;
a motor disposed at a rear end away from the mount;
a pinion disposed on a shaft of the motor;
a shaft member passing through the mount in front of the pinion;
an annular gear disposed on the shaft member to mesh with the pinion;
a cam disposed in the annular gear and adjacent to one side;
a linkage secured to the cam;
front and rear plungers disposed on a front end of the linkage;
a cylindrical tube disposed on the plungers in the mount;

a first silicone O-ring disposed on the linkage in a rear end of the cylindrical tube and having a front end adhered to the rear end of the cylindrical tube;

a pump disposed at a front end of the cylindrical tube;

a nozzle seat disposed at a front end of the pump;

a first valve, a compression spring, and a second silicone O-ring disposed between the front end of the pump and the nozzle seat from rear to front sequentially;

a nozzle extending from a front end of the nozzle seat;

a lock plate for securing the nozzle to the nozzle seat;

a third silicone O-ring and a fourth silicone O-ring disposed between the rear end of the nozzle seat and the lock plate from rear to front sequentially wherein the third silicone O-ring is fastened between the nozzle seat and the lock plate, the fourth silicone O-ring is secured onto the nozzle, and the fourth silicone O-ring is adhered to an inner surface of the lock plate;

an inlet pipe disposed on a bottom of the pump; and a water outlet pipe disposed on a top of the pump.

2. The pump body of oral irrigator of claim 1, wherein the mount includes a rear mounting member and a front mounting member threadedly secured together.

3. The pump body of the oral irrigator of claim 1, further comprising a plurality of limit plates disposed on the linkage relative to the first silicone O-ring for mounting the first silicone O-ring.

4. The pump body of the oral irrigator of claim 1, wherein the second silicone O-ring is disposed on the nozzle seat, and front and rear ends of the compression spring urge against the nozzle and the first valve respectively.

5. The pump body of the oral irrigator of claim 1, further comprising a fitting connected the inlet pipe to the pump, a second valve disposed on a top of the fitting, and a fifth silicone O-ring disposed below the second valve.

6. The pump body of the oral irrigator of claim 5, further comprising an inlet adapter disposed at an inlet of the inlet pipe, and a sixth silicone O-ring disposed on the inlet adapter.

7. The pump body of the oral irrigator of claim 1, further comprising a water outlet adapter disposed on an outlet of the water outlet pipe, and a seventh silicone O-ring is disposed on the water outlet pipe.

8. The pump body of the oral irrigator of claim 1, further comprising a rechargeable battery in the rear of the mount and adjacent to one side of the mount for providing electricity to the motor.

* * * * *